(No Model.)
T. B. JEFFERY.
VELOCIPEDE.
No. 527,607.　　　　　　　　　Patented Oct. 16, 1894.
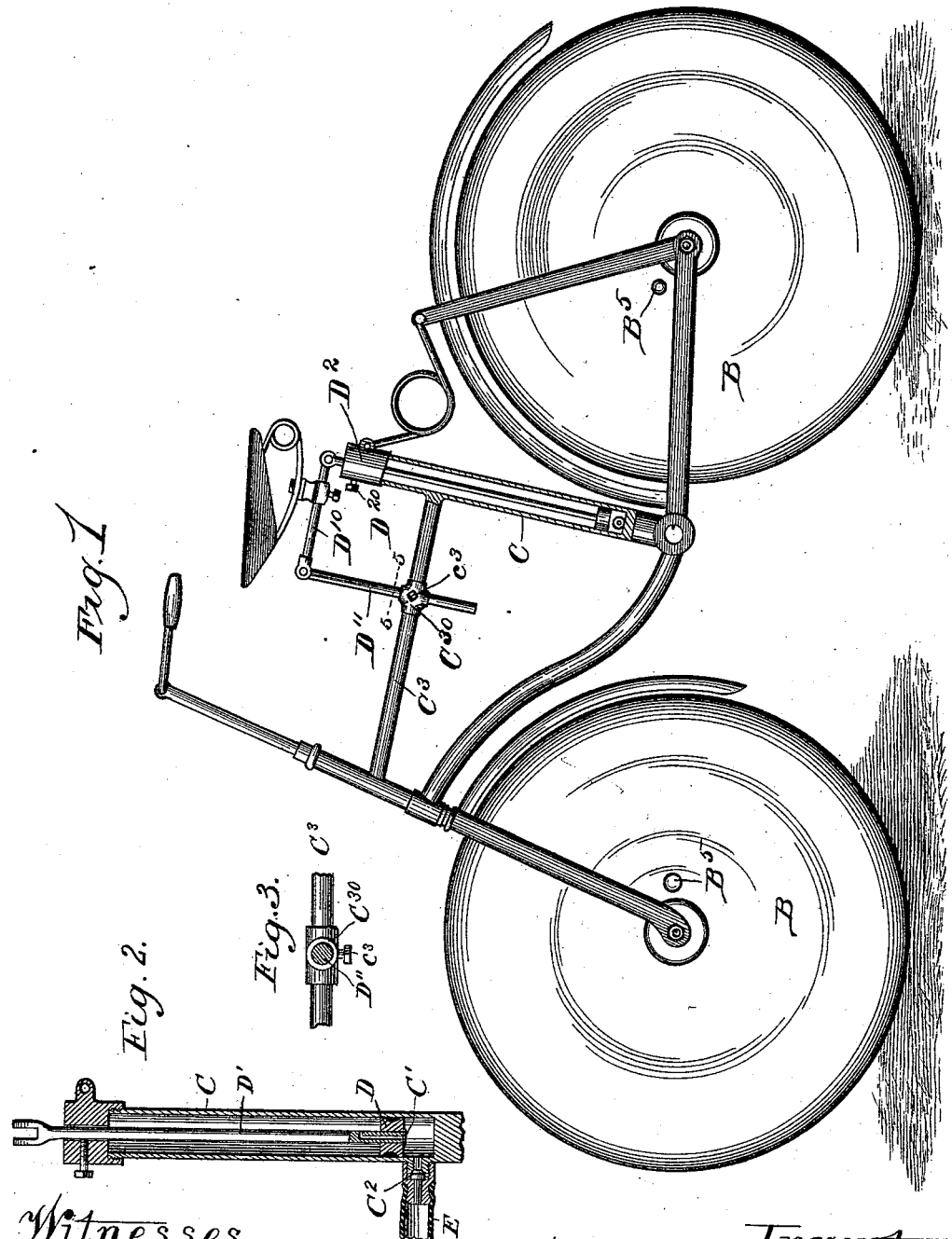

UNITED STATES PATENT OFFICE.

THOMAS B. JEFFERY, OF CHICAGO, ILLINOIS.

VELOCIPEDE.

SPECIFICATION forming part of Letters Patent No. 527,607, dated October 16, 1894.

Application filed March 28, 1892. Serial No. 426,649. (No model.)

*To all whom it may concern:*

Be it known that I, THOMAS B. JEFFERY, a citizen of the United States, residing at Chicago, county of Cook, and State of Illinois, have invented certain new and useful Improvements in Velocipedes, which are fully set forth in the following specification, reference being had to the accompanying drawings, forming a part thereof.

Figure 1 is a sectional side elevation of a bicycle embodying my invention, the driving gear being omitted as not pertaining specifically to the invention, section being made axially through a vertical tubular portion of the frame. Fig. 2 is a section axially through one of the tubular arms or trunk of the machine frame, which is utilized in a specific way for purposes relating to my invention. Fig. 3 is a horizontal section at the line 5—5 on Fig. 1.

In my invention I employ a frame, some tubular arm or trunk of which may be utilized as a cylinder of an air pump for inflating any inflatable portion of the wheel. In the drawings, I have illustrated a wheel having an inflatable body which may be thus inflated.

It is convenient to utilize for this purpose the upstanding trunk C of the frame, of the form shown in the drawings, for such purpose.

It will be obvious that the details may be modified indefinitely, and I have undertaken to show only in a conventional manner the construction of the pump and the relation of its parts other than the said frame tube which constitutes the pump cylinder, to the remainder of the machine.

D represents conventionally the piston; D', the piston rod.

C' represents the air-intake check valve, and $C^2$, the air discharge check valve, whose body is exteriorly adapted to receive a piece of hose, E, which is long enough to extend therefrom to a filling orifice $B^5$ in the wheel body B of either wheel. It will be understood that the expedients for connecting and disconnecting this hose from the wheel body, and for checking the air at said orifice, and for capping it when the hose is disconnected, may be the usual ones employed in pneumatic tires.

An advantage of selecting for the pump cylinder an arm or trunk of the frame in such position as that of the arm C herein shown, is that thereby the rod D', which actuates the piston and constitutes the pump rod, may be a stem of the seat support, and I have herein shown such a construction, said rod D' being connected at the upper end outside of the pump cylinder to a horizontally extending arm $D^{10}$, adapted to support the seat. In case no other support were provided for this arm beside the stem which constitutes the piston rod, it would be necessary to make it rigid with the said piston rod and provide means for clamping the latter securely at the upper end of the trunk C, which constitutes the pump cylinder when it is not in use for the purpose of pumping but is in use for the purpose of holding the seat. A set screw $D^{20}$ in the cap $D^2$, which incloses the upper end of the cylinder C, and affords guidance to the rod when operating as a pump rod, will accomplish the purpose of clamping the piston rod, but I prefer to add to the security of the seat support and accomplish an additional purpose which will appear, by providing at the other end of the horizontal arm $D^{10}$, the additional supporting rod $D^{11}$, parallel with the rod D', and providing on the frame, as through the cross bar $C^3$, an eye $C^{30}$, through which the supporting rod $D^{11}$ may extend. A set screw $c^3$ serves to secure the rod $D^{11}$ in any position to which it may be adjusted in the eye $C^{30}$. The two supports which the horizontal seat supporting rod $D^{10}$ thus obtains being independently adjustable vertically, means is provided for tilting the seat slightly to accommodate the preference of the rider, and also, by the double support, the vertically adjusted position of the seat is made very secure.

I claim—

1. In a velocipede, a tubular arm of the frame adapted to serve as the cylinder of an air pump, in combination with a piston therein and a piston rod extending therefrom, and means for connecting an air duct thereto: substantially as set forth.

2. In a velocipede, in combination with a tubular portion of the frame, a piston and piston rod adapted to be reciprocated therein, and an air outlet valve attached to said tubular frame: substantially as set forth.

3. In a velocipede, in combination with a tubular portion of the frame adapted to serve as the cylinder of an air pump, a piston therein, and a seat support having a rod extending longitudinally into such tubular arm of the frame and secured to the piston, whereby the said seat-supporting arm serves as the piston rod for the pump: substantially as set forth.

4. In combination with a velocipede frame having a tubular portion adapted to serve as a cylinder for the pump, the piston therein and the piston rod extending therefrom; a seat support vertically adjustable in the frame and connected to the upper end of said piston rod, whereby it is further supported: substantially as set forth.

5. In combination with a horizontal seat-supporting rod or arm, the seat adjustable fore-and-aft on such arm, and two supports for the arm in line fore-and-aft, each of said supports being independently adjustable vertically on the frame: substantially as set forth.

In testimony whereof I have hereunto set my hand, at Chicago, Illinois, in the presence of two witnesses, this 23d day of March, 1892.

THOS. B. JEFFERY.

Witnesses:
JEAN ELLIOTT,
CHAS. S. BURTON.